United States Patent
Yang et al.

(10) Patent No.: US 11,495,006 B2
(45) Date of Patent: Nov. 8, 2022

(54) OBJECT DETECTION METHOD FOR STATIC SCENE AND ASSOCIATED ELECTRONIC DEVICE

(71) Applicant: Realtek Semiconductor Corp., HsinChu (TW)

(72) Inventors: Chao-Hsun Yang, HsinChu (TW); Shang-Lun Chan, HsinChu (TW); Shih-Tse Chen, HsinChu (TW); Chien-Hao Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 325 days.

(21) Appl. No.: 16/865,409

(22) Filed: May 3, 2020

(65) Prior Publication Data
US 2021/0182588 A1    Jun. 17, 2021

(30) Foreign Application Priority Data
Dec. 13, 2019   (TW) ................................ 108145639

(51) Int. Cl.
*G06V 10/22* (2022.01)
*G06K 9/62* (2022.01)

(52) U.S. Cl.
CPC ........... *G06V 10/22* (2022.01); *G06K 9/6298* (2013.01); *G06V 2201/07* (2022.01)

(58) Field of Classification Search
None
See application file for complete search history.

(56) References Cited

U.S. PATENT DOCUMENTS

2019/0130583 A1* 5/2019 Chen ..................... G06T 7/11
2019/0130586 A1* 5/2019 Zhou .................... G06T 7/194

FOREIGN PATENT DOCUMENTS

TW          201937407 A       9/2019

* cited by examiner

*Primary Examiner* — David Perlman
(74) *Attorney, Agent, or Firm* — Winston Hsu

(57) ABSTRACT

An object detection method and an associated electronic device are provided, wherein the object detection method includes: utilizing an image processing circuit to determine whether motion occurs in an image to generate a determination result; selectively utilizing a specific bounding box to identify a target object to generate an identification result according to the determination result, wherein the specific bounding box represents a location of the target object in a previous image; and selectively updating information of the specific bounding box according to the identification result.

16 Claims, 6 Drawing Sheets

OBJECT DETECTION METHOD FOR STATIC SCENE AND ASSOCIATED ELECTRONIC DEVICE

BACKGROUND OF THE INVENTION

1. Field of the Invention

The present invention is related to object detection, and more particularly, to an object detection method and an associated electronic device.

2. Description of the Prior Art

Object detection, which aims to detect a location of a specific object in an input image, has become a popular technique. Many object detection methods need to scan the whole input image (e.g. by adopting sliding window with image pyramid for scanning), which requires large calculation costs. When an object to be detected (e.g. a human or an automobile) is moving, however, an overall calculation time and costs may be greatly reduced by merely performing object identification upon location(s) of motion in the input image.

When the object to be detected stops moving, the absence of motion means this object is unable to be detected by even when the object still appears in the scene. In addition, when said object stops moving, a motion region may get smaller, resulting in the captured information being incomplete which may easily introduce misjudgment. Thus, there is a need for a novel method and an electronic device, to improve object detection performance without introducing any side effect or in a way that is less likely to introduce side effects.

SUMMARY OF THE INVENTION

An objective of the present invention is to provide an object detection method (more particularly, an object detection method applicable to a static scene) and an associated electronic device, that can improve object detection performance based on detection of motion information.

At least one embodiment of the present invention provides an object detection method. The object detection method comprises: utilizing an image processing circuit to determine whether motion occurs in an image to generate a determination result; selectively utilizing a specific bounding box to identify a target object to generate an identification result according to the determination result, wherein the specific bounding box represents a location of the target object in a previous image; and selectively updating information of the specific bounding box according to the identification result.

At least one embodiment of the present invention provides an electronic device. The electronic device comprises a camera module, a storage device, and an image processing circuit coupled to the camera module and the storage device. The camera module may be configured to capture an image, and the storage device maybe configured to store information of a specific bounding box, wherein the specific bounding box represents a location of a target object in a previous image. In addition, the image processing circuit maybe configured to execute a program code to perform object detection upon the image. For example: the image processing circuit determines whether motion occurs in the image to generate a determination result; the image processing circuit selectively utilizes the specific bounding box to identify the target object to generate an identification result according to the determination result; and the image processing circuit selectively updates the information of the specific bounding box according to the identification result.

The object detection method and the electronic device of the present invention provide a corresponding bound box modification mechanism respectively regarding conditions with/without motion, to guarantee precise determination of whether a target object appears in an image under various conditions (e.g. conditions where the object is moving, the object is stopping, and the object is completely static). In comparison with related arts, embodiments of the present invention will not greatly increase additional costs. Thus, the present invention can improve the performance of object detection without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
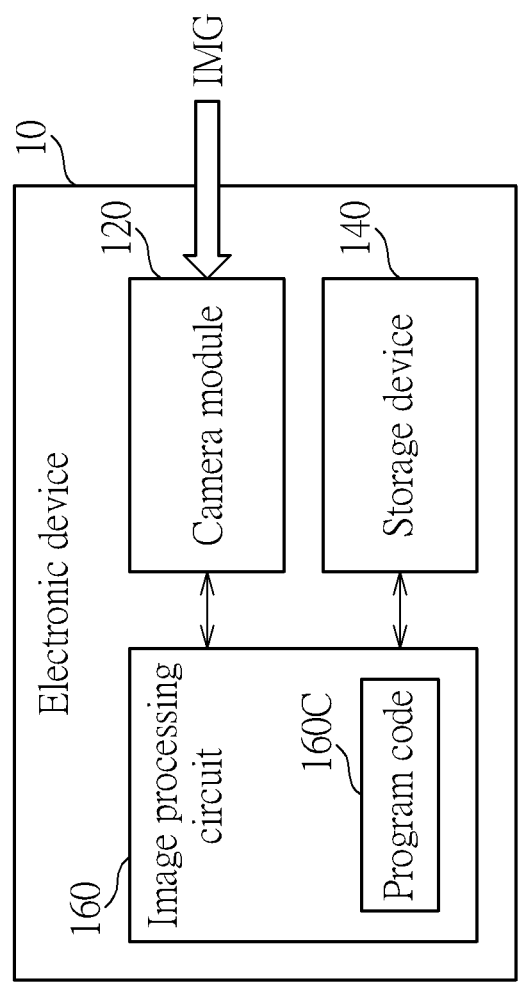
FIG. 1 is a diagram illustrating an electronic device according to an embodiment of the present invention.

FIG. 1 is a diagram illustrating an electronic device 10 according to an embodiment of the present invention, where the electronic device 10 may comprise a camera module 120, a storage device 140, and an image processing circuit 160 coupled to the camera module 120 and the storage device 140. In this embodiment, the camera module 120 maybe configured to capture an image IMG, and the storage device 140 may be configured to store information of a specific bounding box and background model, where the specific bounding box represents a location of a target object (e.g. a human or an automobile) in a previous image. In addition, the image processing circuit 160 may be configured to execute a program code 160C to perform object detection on the image IMG (e.g. detecting whether the target object appears in the image IMG). More particularly, the image processing circuit 160 may determine whether motion occurs in the image IMG to generate a determination result. For example, the image processing circuit 160 may determine a region with moving object by frame difference of previous/current frames or by establishing a background model. According to the determination result, the image processing circuit 160 may selectively utilize the specific bounding box to identify the target object to generate an identification result. For example, the image processing circuit 160 may perform identification of the target object upon the region by a neural network model established in the program code 160C, and output a corresponding confidence value, wherein the confidence value is positively correlated with a probability of an object within the region being the target object (e.g. the greater the confidence value, the higher the probability of the object within the region being the target object). When the confidence value is greater than a confidence threshold value, the image processing circuit 160 determines that the target object appears in the image IMG (more particularly, in the region). According to the identification result, the image processing circuit 160 may selectively update the information of the specific bounding box (e.g. a size and/or a location of the specific bounding box), to guarantee that the latest information of the specific bounding box can be utilized for identification of the target object regarding a next image.

Figure 2:
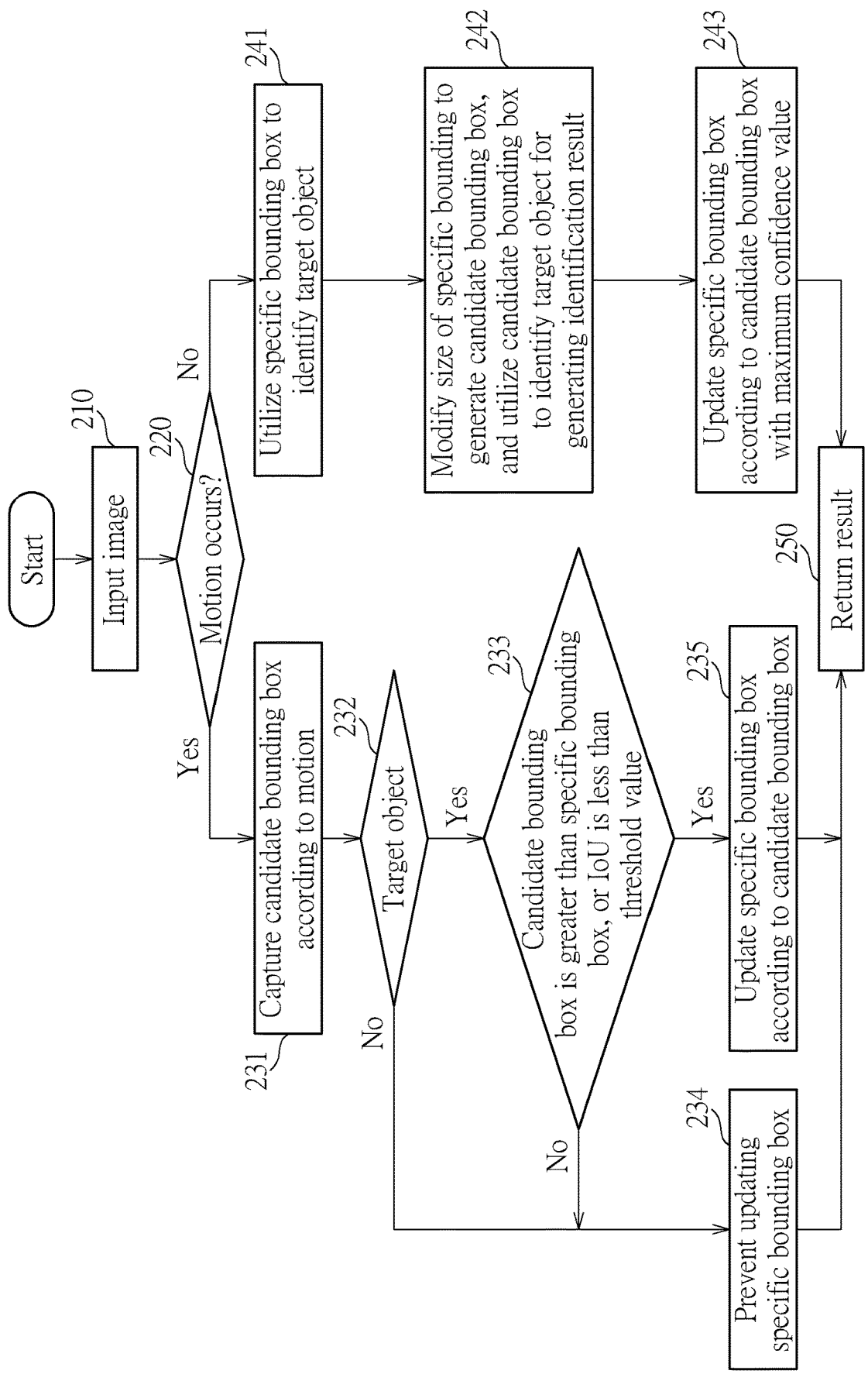
FIG. 2 is a working flow of an object detection method according to an embodiment of the present invention.

FIG. 2 is a working flow of an object detection method according to an embodiment of the present invention, where the object detection method is applicable to the electronic device 10 shown in FIG. 1. If a same or similar result can be obtained, the order of one or more steps within the working flow shown in FIG. 2 may vary. Further, one or more steps may be added, deleted or modified in the working flow.

In Step 210, the image processing circuit 160 may capture the image IMG (input image) through the camera module 120.

In Step 220, the image processing circuit 160 may determine whether motion occurs in the image IMG to generate a determination result. If yes, the flow enters Step 231; otherwise, the flow enters Step 241.

Figure 3:
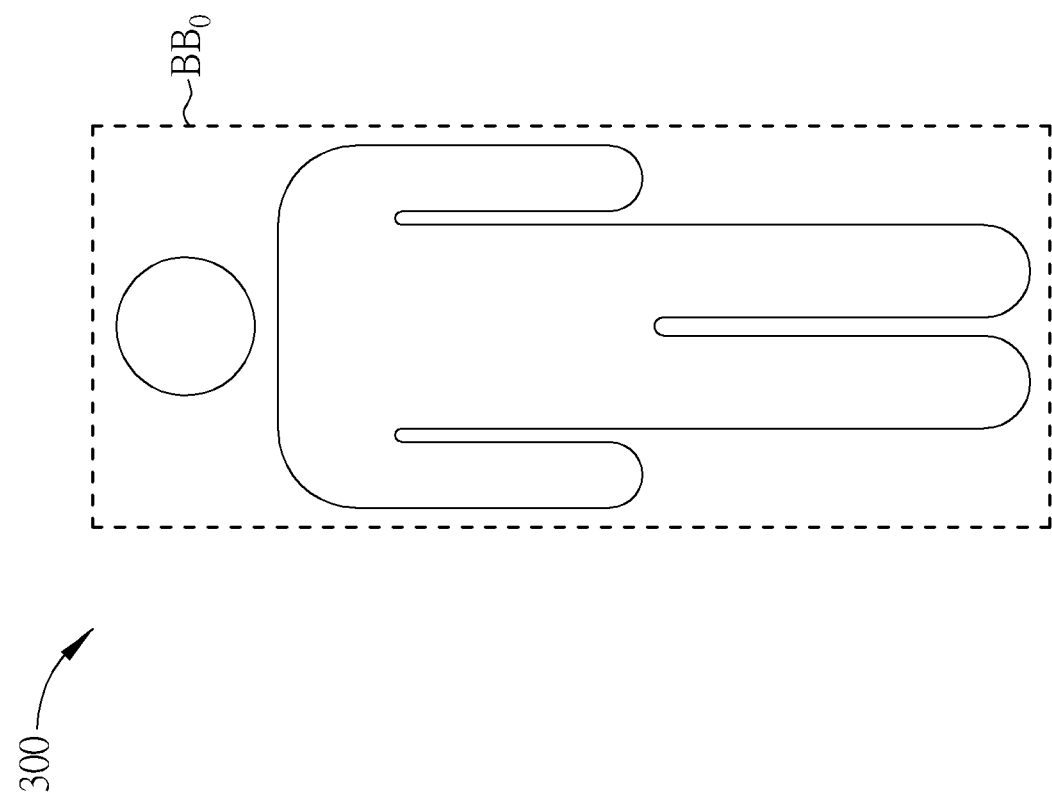
FIG. 3 is a diagram illustrating a candidate bounding box within an image according to an embodiment of the present invention.

In Step 231, the image processing circuit 160 may capture at least one candidate bounding box according to a location of the motion in the image IMG. For example, when the whole target object is moving, the image processing circuit 160 may capture a corresponding candidate bounding box (e.g. a bounding box $BB_0$ within an image 300 shown in FIG. 3) according to a region having the motion occurring in the image IMG. In another example, during a process of the target object (e.g. a human or an automobile) stopping moving, motion might occur in partial region(s) of the target object only, so the image processing circuit 160 may accordingly generate one or more corresponding candidate bounding boxes (e.g. bounding boxes $BB_1$, $BB_2$ and $BB_3$ within the image 400 shown in FIG. 4). For better comprehension, the following descriptions use the bounding box $BB_0$ shown in FIG. 3 as an example of the specific bounding box, and more particularly, as an example of the specific bounding box having sufficient high confidence value (e.g. greater than the confidence threshold value).

In Step 232, the image processing circuit 160 may utilize the aforementioned at least one candidate bounding box to identify the target object, e.g. determining whether an object within the aforementioned at least one candidate bounding box (e.g. the bounding boxes $BB_1$, $BB_2$ and $BB_3$) is the target object. If yes, the flow enters Step 233; otherwise, the flow enters Step 234.

In Step 233, the image processing circuit 160 may determine whether a size of the aforementioned at least one candidate bounding box (e.g. a total size of the bounding boxes $BB_1$, $BB_2$ and $BB_3$) is greater than a size of the specific bounding box (e.g. the bounding box $BB_0$), or whether an intersection over union (IoU) of the aforementioned at least one candidate bounding box (e.g. the bounding boxes $BB_1$, $BB_2$ and $BB_3$) relative to the specific bounding box (e.g. the bounding box $BB_0$) is less than an IoU threshold value. If yes, the flow enters Step 235; otherwise (e.g. the size of the aforementioned at least one candidate bounding box is less than the size of the specific bounding box and the IoU of the aforementioned at least one candidate bounding box relative to the specific bounding box is greater than the IoU threshold value), the flow enters Step 234. Calculation of IoU is shown as follows:

$$IoU = (A(BBOX_{current} \cap BBOX_{previous}))/A(BBOX_{previous});$$

where the symbol A( ) represents an area, $BBOX_{current}$ and $A(BBOX_{current})$ respectively represent a region covered by the aforementioned at least one candidate bounding box (e.g. the bounding boxes $BB_1$, $BB_2$ and $BB_3$) captured by current motion detection and an area of this region (e.g. an area/size of the region covered by the bounding boxes $BB_1$, $BB_2$ and $BB_3$), $BBOX_{previous}$ and $A(BBOX_{previous})$ respectively represent a region covered by a previous candidate bounding box such as the specific bounding box (e.g. the bounding box $BB_0$) and an area of this region (e.g. an area/size of the region covered by the bounding box $BB_0$), and $BBOX_{current} \cap BBOX_{previous}$ and $A(BBOX_{current} \cap BBOX_{previous})$ respectively represent an intersection region of the region covered by the aforementioned at least one candidate bounding box $BBOX_{current}$ captured by the current motion detection and the region covered by the previous candidate bounding box $BBOX_{previous}$ and an area of the intersection region, but the present invention is not limited thereto.

Figure 5:
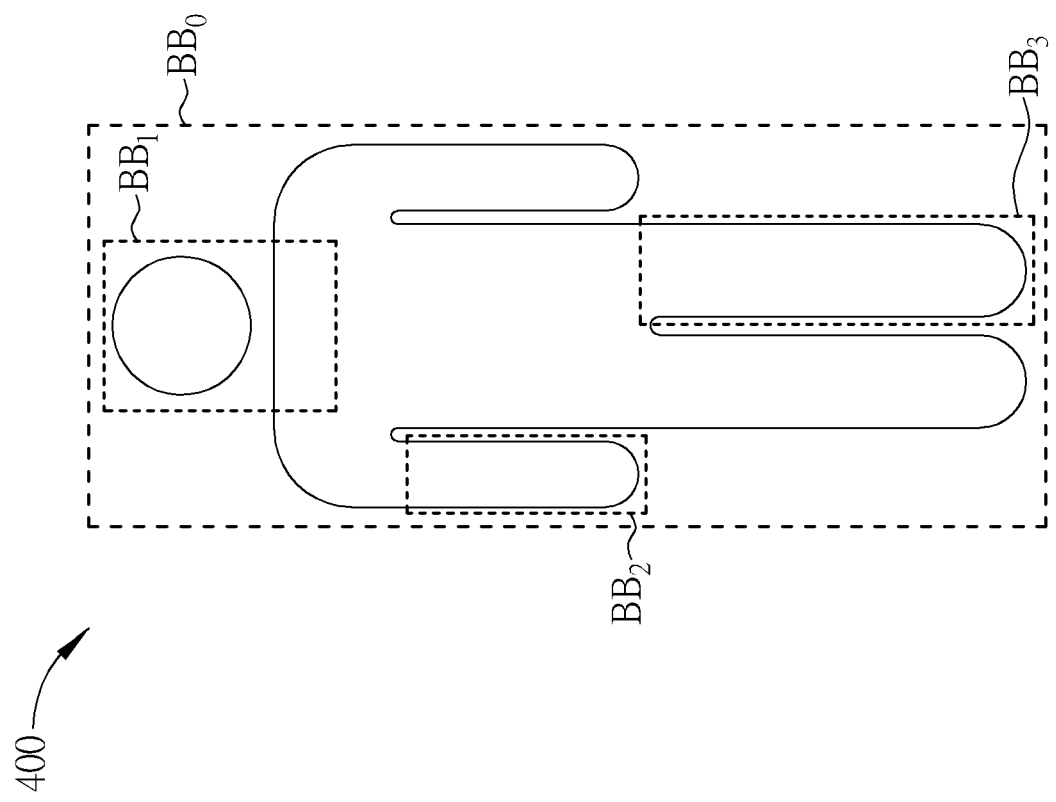
FIG. 5 is a diagram illustrating candidate bounding boxes within an image according to an embodiment of the present invention.

In Step 234, the image processing circuit 160 may prevent updating the information of the specific bounding box. For example, when the image processing circuit 160 determines that the object within the bounding boxes $BB_1$, $BB_2$ and $BB_3$ is not the target object in Step 232, or when the image processing circuit 160 determines that the sizes of the bounding boxes $BB_1$, $BB_2$ and $BB_3$ are less than the size of the bounding box $BB_0$ and the IoU of the bounding boxes $BB_1$, $BB_2$ and $BB_3$ relative to the bounding box $BB_0$ is greater than the IoU threshold value in Step 233, the image processing circuit 160 may maintain the information of the bounding box $BB_0$, in order to fully capture information of the target object, as shown in FIG. 5.

In Step 235, the image processing circuit 160 may update the information of the specific bounding box according to the aforementioned at least one candidate bounding box.

In Step 241, the image processing circuit 160 may utilize the specific bounding box (e.g. the bounding box $BB_0$) to identify the target object.

Figure 6:
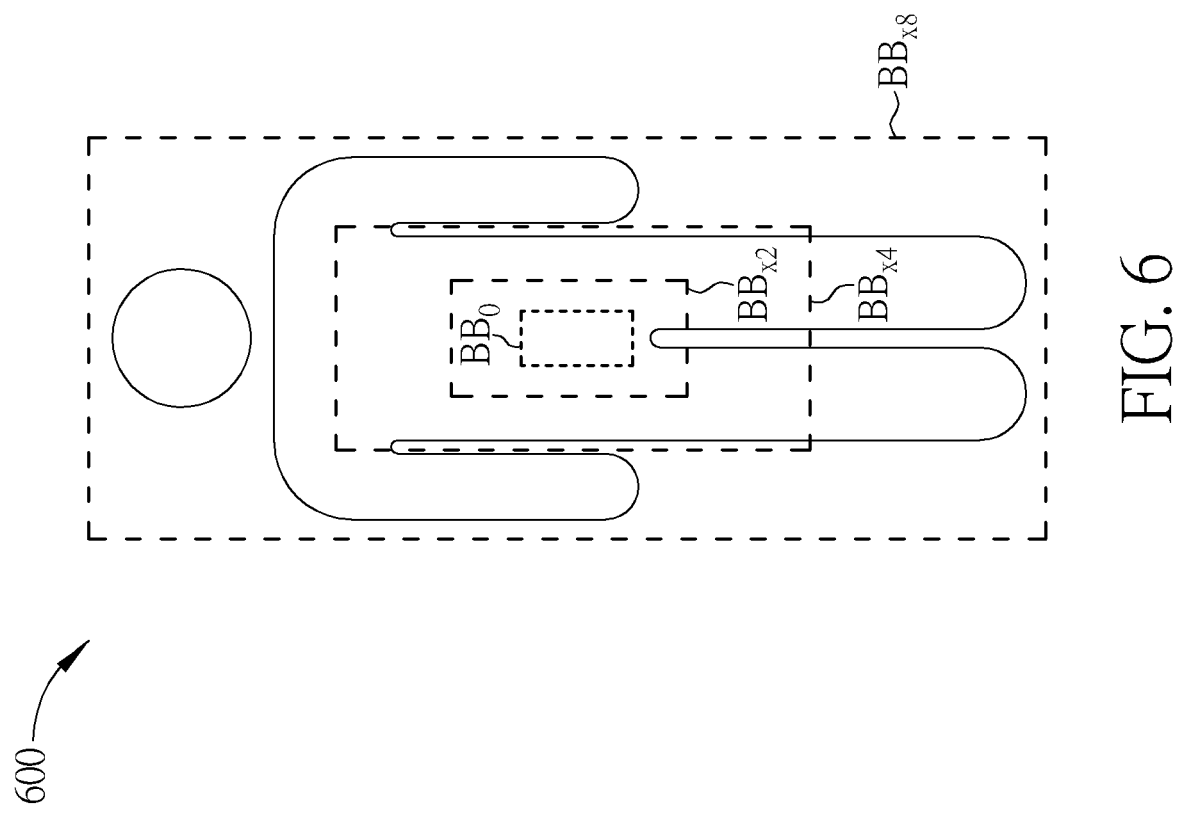
FIG. 6 is a diagram illustrating candidate bounding boxes within an image according to an embodiment of the present invention.

In Step 242, the image processing circuit 160 may modify the size of the specific bounding box (e.g. the bounding box $BB_0$) to generate at least one candidate bounding box, and utilize the aforementioned at least one candidate bounding box to identify the target object for generating the identification result. For example, the image processing circuit 160 may amplify the bounding box $BB_0$ by a factor of two, four and eight based on the size and the location of the bounding box $BB_0$ to generate multiple candidate bounding boxes respectively having multiple sizes (such as bounding boxes $BB_{x2}$, $BB_{x4}$ and $BB_{x8}$ within an image 600 shown in FIG. 6), and calculate multiple confidence values of the multiple candidate bounding boxes, respectively, where any confidence value within the multiple confidence values is positively correlated with a probability of an object within a candidate bounding box corresponding to this confidence value being the target object. For example, the greater the confidence value, the greater the probability of the object within the candidate bounding box corresponding to the confidence value being the target object. It should be noted that a number and values of the above multiple different amplification rates are not limitations of the present invention, and the number and values of the multiple different amplification rates may be designed in response to limitation of hardware resources (e.g. calculation capability).

In Step 243, the image processing circuit 160 may update the information of the specific bounding box according to the candidate bounding box with the maximum confidence value in the multiple candidate bounding boxes. In practice, the closer the sizes of a candidate bounding box and the target object, the greater the confidence value of this candidate bounding box. Thus, in the embodiment shown in FIG. 6, the image processing circuit 160 may update the information of the specific bounding box according to the bounding box $BB_{x8}$.

In Step 250, the image processing circuit 160 may output a result obtained from the above flow (e.g. information as to whether the target object is detected and/or information of the latest specific bounding box) and store this result into the storage device 140, e.g. return this result to an associated program module operating on the image processing circuit 160, but the present invention is not limited thereto.

In Step 242 and 243, the image processing circuit 160 generates the multiple candidate bounding boxes with multiple sizes, and determines the candidate bounding box with the maximum confidence value therein, but the present invention is not limited thereto. In some embodiments, the image processing circuit 160 may sequentially amplify the bounding box $BB_0$ by a factor of two, four and eight, and if a local maximum confidence value is found when the bounding box $BB_0$ is amplified to a size with a specific amplification rate (e.g. when a confidence value obtained by two times amplification is greater than a confidence value obtained before amplification, and a confidence value obtained by four times amplification is less than the confidence value obtained by two times amplification, the confidence value obtained by two times amplification is a local maximum), the image processing circuit 160 may directly take the local maximum confidence value as a global maximum confidence value for saving calculation.

Although motion detection of a moving object within an image as described in the related art greatly reduces required calculation in comparison with conventional object detection methods that require scanning of an entire image, when an object to be detected gradually stops moving or is static, the related art motion detection might regard the object as part of the background by mistake. The object detection method and the electronic device 10 of the present invention may trigger corresponding mechanisms regarding conditions with and without motion being detected, respectively, to search for the candidate bounding box with the maximum confidence value.

Figure 4:
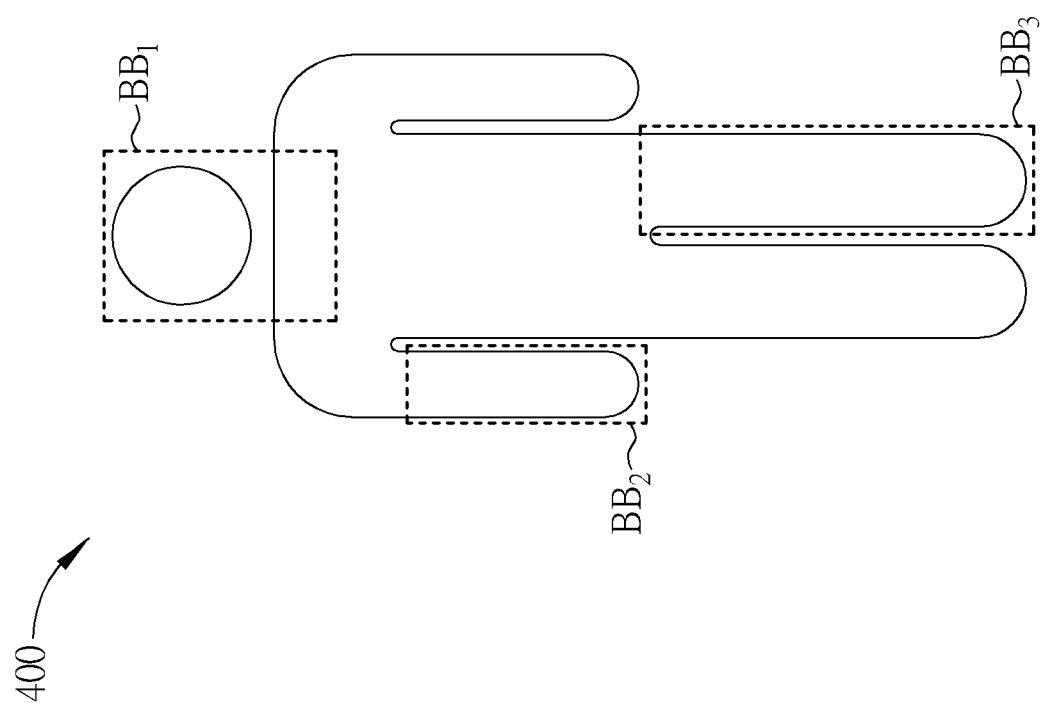
FIG. 4 is a diagram illustrating candidate bounding boxes within an image according to an embodiment of the present invention.

For example, during a process of a target object to be detected stopping moving, motion merely occurs in a portion of regions within this target object, and the image processing circuit 160 may capture one or more candidate bounding boxes with smaller sizes as shown in FIG. 4. As the sizes of the one or more candidate bounding boxes are less than a size of a candidate bounding box that is maintained while processing a previous image (e.g. the specific bounding box), and IoU of these bounding boxes exceeds an IoU threshold value, the image processing circuit 160 may directly keep the specific bounding box to guarantee that most information can be obtained as shown in FIG. 5.

In another example, when a target object to be detected gradually moves closer to the electronic device 10, thereby resulting in only partial regions of this target object being captured (such as a region captured by the bounding box BB0 shown in FIG. 6), the image processing circuit 160 may modify the size of the bounding box $BB_0$ to find the candidate bounding box with the maximum confidence value.

To summarize, the object detection method and the electronic device of the present invention provide corresponding bounding box modification mechanisms regarding conditions with and without motion being detected, to guarantee that information as to whether a target object appears in an image can be detected under various conditions (e.g. where the object is moving, the object gradually stops moving, and the object is completely static), and at least one reliable candidate bounding box can be stored for object detection using subsequent input images. In comparison with the related art, embodiments of the present invention will not greatly increase additional costs, so the present invention can improve object detection performance without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object detection method, comprising:
utilizing an image processing circuit to determine whether motion occurs in an image to generate a determination result;
selectively utilizing a specific bounding box to identify a target object to generate an identification result according to the determination result, wherein the specific bounding box represents a location of the target object in a previous image;
selectively updating information of the specific bounding box according to the identification result; and
when the determination result indicates that no motion occurs in the image, utilizing the specific bounding box to identify the target object;
wherein the step of utilizing the specific bounding box to identify the target object comprises:
modifying a size of the specific bounding box to generate at least one candidate bounding box; and
utilizing the at least one candidate bounding box to identify the target object to generate the identification result.

2. The object detection method of claim 1, wherein the step of modifying the size of the specific bounding box to generate the at least one candidate bounding box comprises generating multiple candidate bounding boxes respectively having multiple sizes; and the step of utilizing the at least one candidate bounding box to identify the target object to generate the identification result comprises utilizing the image processing circuit to calculate multiple confidence values of the multiple candidate bound boxes, respectively, wherein any confidence value within the multiple confidence values is positively correlated with a probability of an object within a candidate bounding box corresponding to said any confidence value being the target object.

3. The object detection method of claim 2, wherein the step of selectively updating the information of the specific bounding box according to the identification result comprises updating the information of the specific bounding box according to a candidate bounding box with a maximum confidence value in the multiple candidate bounding boxes.

4. The object detection method of claim 1, wherein the step of selectively utilizing the specific bounding box to identify the target object to generate the identification result according to the determination result comprises:

when the determination result indicates that motion occurs in the image, capturing at least one candidate bounding box according to a location of the motion in the image, and utilizing the at least one candidate bounding box to identify the target object to generate the identification result.

5. The object detection method of claim 4, wherein the step of selectively updating the information of the specific bounding box according to the identification result comprises:

when the identification result indicates that an object within the at least one candidate bounding box is not the target object, preventing updating the information of the specific bounding box.

6. The object detection method of claim 4, wherein the step of selectively updating the information of the specific bounding box according to the identification result comprises:

when the identification result indicates that an object within the at least one candidate bounding box is the target object, selectively updating the information of the specific bounding box according to a size of the at least one candidate bounding box or an intersection over union (IoU) of the at least one candidate bounding box relative to the specific bounding box.

7. The object detection method of claim 6, wherein the step of selectively updating the information of the specific bounding box according to the identification result comprises:

when the size of the at least one candidate bounding box is greater than a size of the specific bounding box or the IoU of the at least one candidate bounding box relative to the specific bounding box is less than a threshold value, updating the information of the specific bounding box according to the at least one candidate bounding box.

8. The object detection method of claim 6, wherein the step of selectively updating the information of the specific bounding box according to the identification result comprises:

when the size of the at least one candidate bounding box is less than a size of the specific bounding box and the IoU of the at least one candidate bounding box relative to the specific bounding box is greater than a threshold value, preventing updating the information of the specific bounding box.

9. An electronic device, comprising:
a camera module, configured to capture an image;
a storage device, configured to store information of a specific bounding box, wherein the specific bounding box represents a location of a target object in a previous image; and
an image processing circuit, coupled to the camera module and the storage device, configured to execute a program code to perform object detection upon the image, wherein:
the image processing circuit determines whether motion occurs in the image to generate a determination result;
the image processing circuit selectively utilizes the specific bounding box to identify the target object to generate an identification result according to the determination result;
the image processing circuit selectively updates the information of the specific bounding box according to the identification result; and
when the determination result indicates that no motion occurs in the image, the image processing circuit utilizes the specific bounding box to identify the target object, wherein the image processing circuit modifies a size of the specific bounding box to generate at least one candidate bounding box, and utilizes the at least one candidate bounding box to identify the target object to generate the identification result.

10. The electronic device of claim 9, wherein the image processing circuit generates multiple candidate bounding boxes respectively having multiple sizes, and calculates multiple confidence values of the multiple candidate bound boxes, respectively, wherein any confidence value within the multiple confidence values is positively correlated with a probability of an object within a candidate bounding box corresponding to said any confidence value being the target object.

11. The electronic device of claim 10, wherein the image processing circuit updates the information of the specific bounding box according to a candidate bounding box with a maximum confidence value in the multiple candidate bounding boxes.

12. The electronic device of claim 9, wherein when the determination result indicates that motion occurs in the image, the image processing circuit captures at least one candidate bounding box according to a location of the motion in the image, and utilizes the at least one candidate bounding box to identify the target object to generate the identification result.

13. The electronic device of claim 12, wherein when the identification result indicates that an object within the at least one candidate bounding box is not the target object, the image processing circuit prevents updating the information of the specific bounding box.

14. The electronic device of claim 12, wherein when the identification result indicates that an object within the at least one candidate bounding box is the target object, the image processing circuit selectively updates the information of the specific bounding box according to a size of the at least one candidate bounding box or an intersection over union (IoU) of the at least one candidate bounding box relative to the specific bounding box.

15. The electronic device of claim 14, wherein when the size of the at least one candidate bounding box is greater than a size of the specific bounding box or the IoU of the at least one candidate bounding box relative to the specific bounding box is less than a threshold value, the image processing circuit updates the information of the specific bounding box according to the at least one candidate bounding box.

16. The electronic device of claim 14, wherein when the size of the at least one candidate bounding box is less than a size of the specific bounding box and the IoU of the at least one candidate bounding box relative to the specific bounding box is greater than a threshold value, the image processing circuit prevents updating the information of the specific bounding box.

* * * * *